Figure 1:
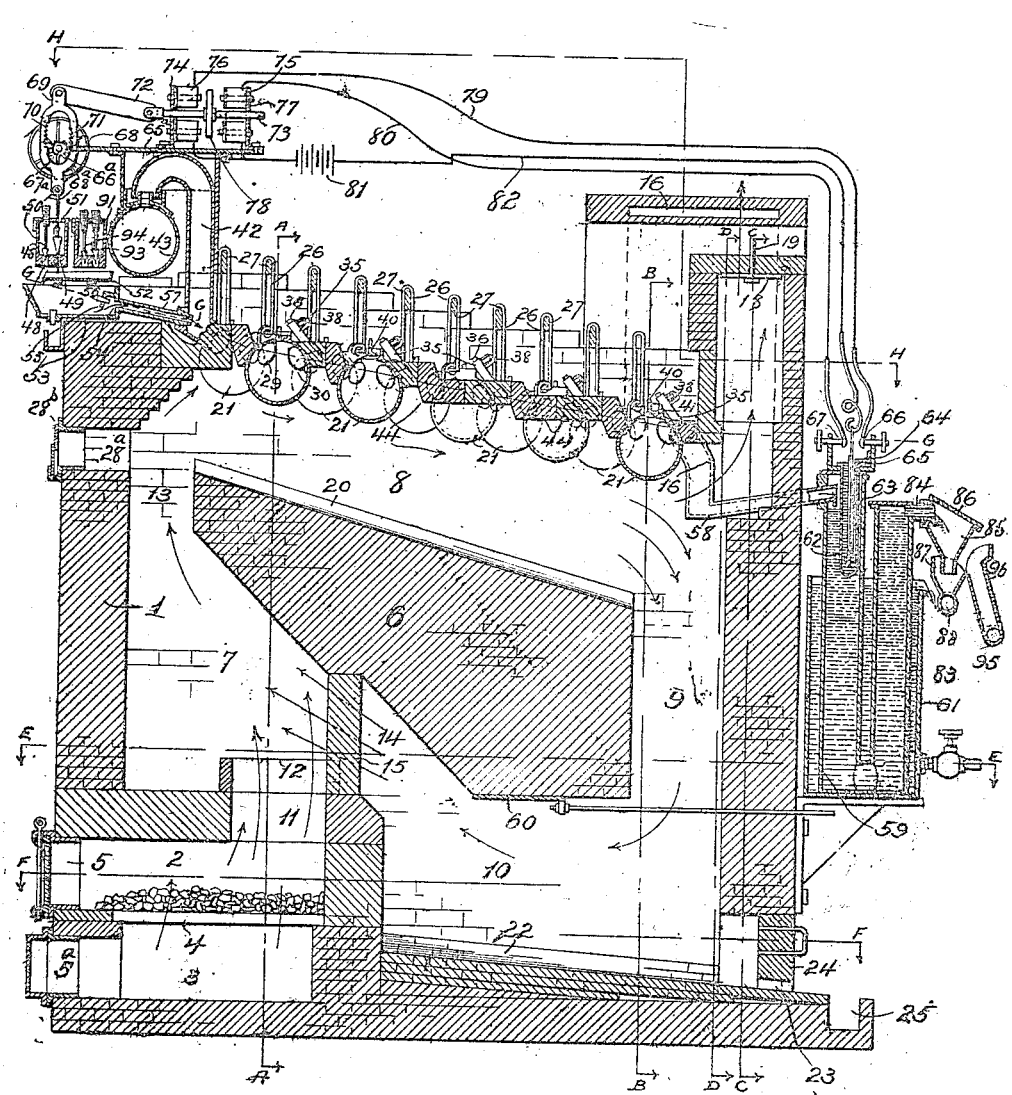

J. PATTEN.
APPARATUS FOR AND METHOD OF CONCENTRATING SULFURIC ACID.
APPLICATION FILED OCT. 24, 1917.

1,294,827.

Patented Feb. 18, 1919.
5 SHEETS—SHEET 1.

WITNESSES

INVENTOR

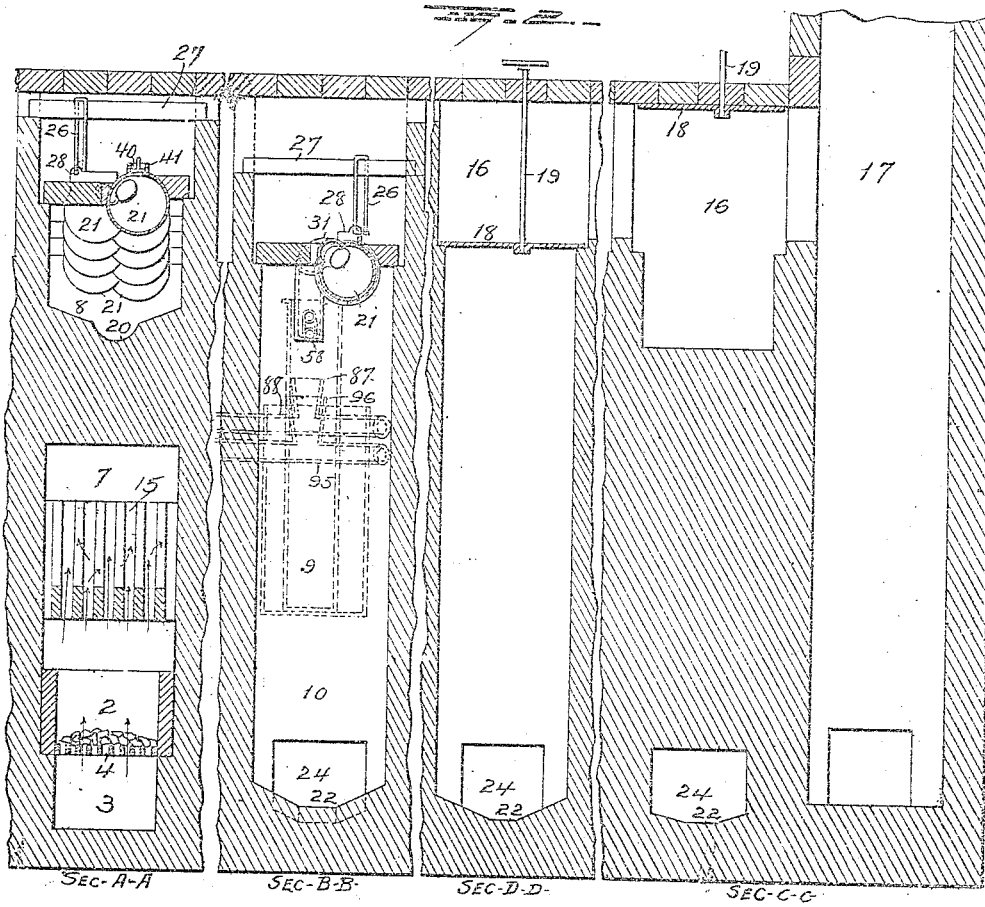

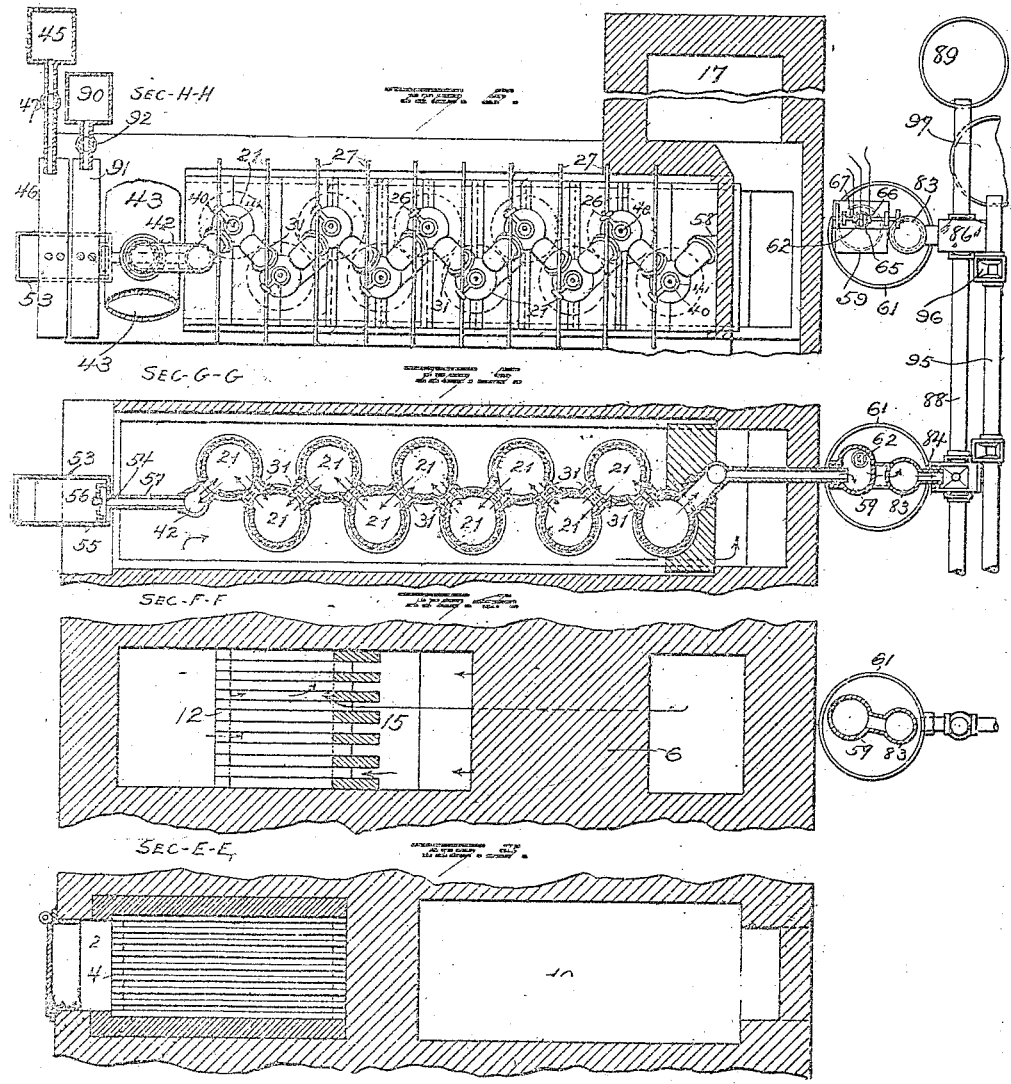

J. PATTEN.
APPARATUS FOR AND METHOD OF CONCENTRATING SULFURIC ACID.
APPLICATION FILED OCT. 24, 1917.
1,294,827.
Patented Feb. 18, 1919.
5 SHEETS—SHEET 4.
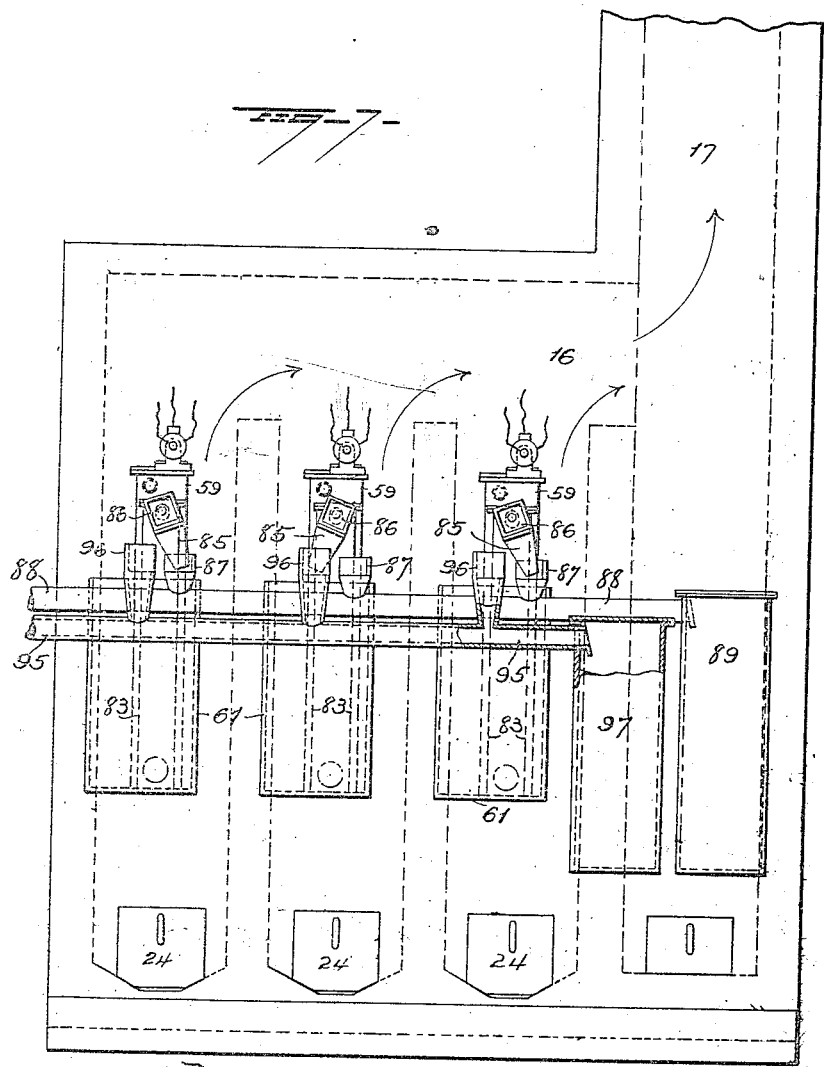
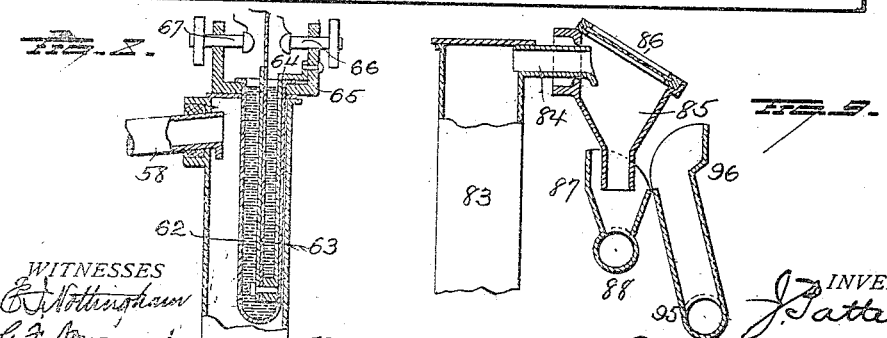

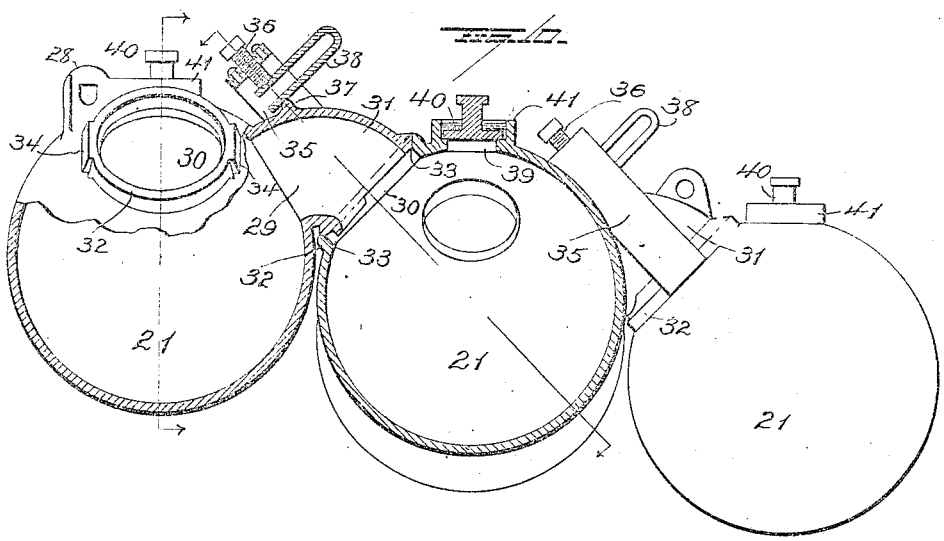
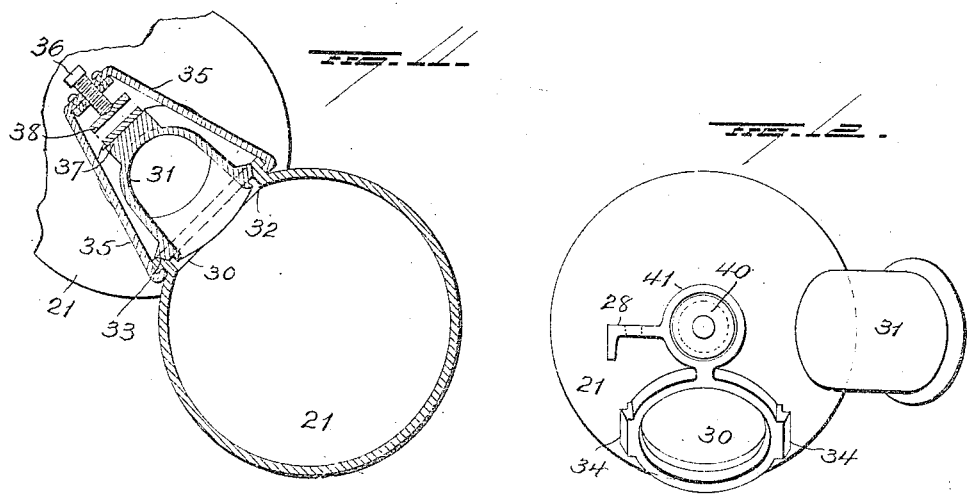

UNITED STATES PATENT OFFICE.

JOHN PATTEN, OF BALTIMORE, MARYLAND, ASSIGNOR OF ONE-HALF TO SAMUEL M. SHOEMAKER, OF ECCLESTON, MARYLAND.

APPARATUS FOR AND METHOD OF CONCENTRATING SULFURIC ACID.

1,294,827.  Specification of Letters Patent.  Patented Feb. 18, 1919.

Application filed October 24, 1917. Serial No. 198,324.

*To all whom it may concern:*

Be it known that I, JOHN PATTEN, a citizen of the United States, and a resident of Baltimore city, State of Maryland, have invented certain new and useful Improvements in Apparatus for and Methods of Concentrating Sulfuric Acid; and I do hereby declare the following to be a full, clear, and exact description of the invention, such as will enable others skilled in the art to which it appertains to make and use the same.

This invention relates to improvements in apparatus for and the method of concentrating sulfuric acid,—one object of the invention being to prevent the escape and dissipation of noxious fumes into the atmosphere, and thus overcome the disastrous effect upon vegetation heretofore encountered in the vicinity of plants where sulfuric acid is concentrated.

A further object is to so construct the apparatus that the "splashing" incident to the concentration of sulfuric acid, shall be confined within the vessels in which the concentration is effected, and thus protect the framework of the apparatus from the injurious effect of the acid, and also saving a considerable quantity of acid which has heretofore been lost by escape with the fumes.

A further object is to construct the apparatus in such manner that the water will be so evaporated from the acid, that any acid which may tend to escape with the aqueous vapor shall be separated from the latter and returned to the body of acid in the concentrators, thus preventing the escape of hurtful quantities of acid with the aqueous vapor and permitting the latter to be recovered in a sufficient degree of purity to be capable of employment for any desired useful purpose, or to be condensed or discharged into the atmosphere without deleterious effect upon surrounding vegetation.

A further object is to construct and operate the apparatus in a manner to economize fuel and at the same time maintain a proper degree of heat to effect desired concentration of the acid.

A further object is to so construct the apparatus that during the operation of the same, portions of the furnace gases and products of combustion after having passed under the condensing chambers or evaporators, may be utilized by commingling the same with the hot products of combustion over the fire chamber to reduce the temperature of such hot products before they reach the condensing chambers or evaporators, whereby the latter will not be subjected to destructive temperature.

A further object is to provide an apparatus of the class specified, with simple and efficient containers forming communicating evaporating chambers in which the acid is confined and to so construct and arrange such containers or concentrators that compensation for contraction and expansion may be provided for, without danger of leakage, and so that any one of said containers may be removed when broken and replaced by a new one, without disturbing any other part of the apparatus.

A further object is to construct and operate the apparatus in such manner that the highest temperature of the air and products of combustion from the furnace shall be applied to the end of a series of containers or concentrators where the weak acid is introduced, and also that the temperature of said air and products of combustion will decrease rapidly as they travel to the other end of the series of containers or concentrators from which the strong acid is delivered.

A further object is to provide simple and efficient means whereby the feed of acid to the apparatus may be automatically controlled.

With these and other objects in view, the invention consists in certain novel features of construction and combinations of parts as hereinafter set forth and pointed out in the claims.

In the accompanying drawings; Figure 1 is a longitudinal sectional view of an apparatus embodying my improvements; Fig. 2 is a transverse sectional view, through a battery of units, and showing sections on lines A—A, B—B, C—C, and D—D of Fig. 1; Fig. 3 is a section on the line E—E of Fig. 1; Fig. 4 is a section on the line F—F of Fig. 1;

Fig. 5 is a section on the line G—G of Fig. 1; Fig. 6 is a section on the line H—H of Fig. 1; Figs. 7, 8 and 9 are enlarged detail views showing the discharge devices and portions of the automatic feed control means, and Figs. 10, 11 and 12 are enlarged detail views showing the concentrators.

In apparatus of the character to which my invention relates, it is customary to provide a plurality or battery of units and these may be so built as to provide a unitary structure, as a whole, as indicated in Fig. 2. As these units and the various instrumentalities which therein, are identical in construction, a specific description of one unit will suffice for all of them.

1 represents the masonry of a furnace structure, the combustion chamber 2 of which is separated from the ash pit 3 by a suitable grate 4 on which the fuel is supported. The combustion chamber may be provided with a suitable door 5 and a door opening 5ª communicating with the ash pit will serve to admit air to provide a suitable draft through the furnace. A bridge wall 6 is built within the furnace structure and provides several passages or flues 7, 8, 9 and 10 for the travel of hot products of combustion. The passage 7 is located directly over the combustion chamber and its larger lower portion communicates with the latter through a contracted opening 11 and in order to cause the products of combustion to enter the passage 7 in the form of a plurality of streams, I employ a plurality of spaced bars 12 of fireproof material, directly over the opening 11. The bridge wall is of such form that a contracted passage 13 will connect the upper end of the passage 7 at the left hand end of the furnace structure with the inclined passage 8,—the other end of the latter communicating with the vertical passage 9 at the right hand end of the furnace structure, and said vertical passage 9 communicates at its lower end with one end of the horizontal passage 10 in the bottom portion of the furnace structure. The other end of the bottom passage 10 communicates through a contracted opening 14 with the passage 7,—a plurality of spaced bars 15 being located in said opening to cause the products of combustion to enter the passage 7 in several streams to intimately commingle with the streams of hotter products of combustion flowing into said passage 7 from the combustion chamber.

The passage 8 also communicates, through a flue 16 with a stack 17 and the draft through the stack may be regulated and controlled by means of a damper 18 (Figs. 1 and 2) controlled by a suitable manually operable rod 19. This damper may be closed when it is desired to stop the operation of the apparatus.

The top of the bridge wall 6 is made inclined so as to slant downwardly toward the right hand or discharge end of the apparatus, the upper face of said wall being dished to form a gutter 20 to receive any acid which might escape from containers or condensers 21 disposed over said wall, in the event of leakage or breakage of any of said containers or concentrators. Such escaping acid would flow down over the end of the bridge wall and into a trough 22 in the bottom of the furnace structure and from the latter trough, the escaping acid will flow through an opening 23 in a door 24 and become deposited into an exterior trough 25 which may convey it to a suitable receptacle, not shown.

The concentrators 21 are arranged in a connected series in two rows disposed in a diagonal position above the inclined top of the bridge wall and form, in effect, a large portion of the top of flue or passage 8. The concentrators 21 are individually supported, so that any one of them may be removed when broken and replaced by a new one without disturbing any of the others. Thus the condensers or concentrators are suspended by means of hangers 26 from transverse bars 27 mounted on the walls of the furnace structure above the fire brick,—said hangers being made in the form of bails having the lower ends of their respective members bent inwardly into perforations in lugs 28 on the concentrators.

An opening 28ª (normally closed by a door 28ᵇ) may be provided in the wall of the furnace structure to permit inspection of the concentrators.

The concentrators are made of suitable acid proof material, such for example, as an alloy or iron and silicon, and are made in such form that the acid under treatment will be so confined as to prevent the splashing from reaching other parts of the apparatus. I prefer to make the concentrators spherical in form as clearly shown in Figs. 10, 11 and 12.

Each concentrator is made with two openings 29 and 30 which are disposed at approximately right angles to each other. An elbow nozzle 31 is cast integral with the concentrator coincident with the opening 29 and a flange 32 is formed around the opening 30. The free end portion of the elbow nozzle 31 of one concentrator enters the opening 30 of the adjacent concentrator and a ball joint 33 is formed between said nozzle elbow and the flange 32 of such adjacent concentrator. The flange 32 is formed with shoulders 34 for the reception of the hooked or flanged ends of a bail 35, which latter embraces the elbow nozzle. An adjusting screw 36 passes through the free end of the bail 35 and between the inner end of this screw and a shoulder 37 on the elbow nozzle, a spring 38 (preferably made U-shaped in form) is disposed. With such construction, the various concentrators will be connected in such manner as to compensate for expansion and contraction and permit such slight relative movement as may be caused thereby, without danger of leaking, and the tendency of breakage of the brittle walls of the concentrators will be reduced to a minimum. Each concentrator may be provided with an opening 39 to permit access to the interior thereof, and this opening is normally closed by a cover 40 which may, if desired, be sealed with suitable material inserted within the confines of an annular flange 41 which surrounds said cover.

During the process of concentration of sulfuric acid, a considerable splashing takes place, and unvaporized acid escapes with the steam and if the concentrators were open containers as has been the usual custom, such flying acid would come into contact with the masonry and other parts of the apparatus with resulting injury thereto, and a more or less considerable quantity of acid would be lost. Furthermore, with the use of open concentrators such as heretofore employed, a considerable amount of acid escapes with the steam and when discharged into the atmosphere from the stack, forms a mist or vapor which will travel for greater distances through the air and seriously injure vegetation. With my improvements, the escape of acid with the steam will be reduced to a minimum and the escape of injurious acid mist or vapor into the atmosphere will be practically eliminated. For reasons above stated, the construction of the concentrators of my apparatus, is a matter of considerable importance because, while small particles of vaporized acid are being constantly thrown in different directions, they will strike against the inner surfaces of the spherical concentrators above the acid level and separate from the steam,—the unvaporized acid being permitted by the wall of the concentrator to flow down into the body of acid therein, the vapor escaping through a nozzle elbow to the next concentrator. In this manner the steam resulting from the aqueous content of the acid under treatment will be separated from the latter progressively, and flow through the elbow nozzles from one concentrator to another and in a direction which will be reverse to that of the flow of acid from one concentrator to another. At the left hand or starting end of the apparatus, the steam will flow through a pipe 42 into a drum or receiver 43, from which it may be discharged or employed for any desired useful purpose.

The bottom portions of the concentrators will be subjected to a considerable degree of heat from the products of combustion flowing through the flue or passage 8, and it is important that the upper portions of the concentrators be protected against such a degree of heat. For this purpose, I may employ suitably formed blocks or slabs of fire proof material, such as indicated, at 44.

A supply tank 45 Fig. 6 for the weak acid (about 50 to 61 degrees Bé.) to be concentrated is provided and is connected with a tank 46, a suitable valve, such for example as that illustrated at 47, being provided to control the flow of acid into said tank 46. The tank 46 is provided with discharge outlets 48, 49 and the flow of acid through these outlets is controlled by a manually operable valve 50 and an automatically operable valve 51. Acid will be fed from the tank 46, over a deflector 52 into the outer portion of a pan 53. The vertical wall at the inner end of this pan is provided with a discharge outlet 54 over which a deflector 55 projects, said deflector preferably being provided with a hole which is normally closed by a plug 56. A pipe 57 connects the outlet 54 of the pan 53 with the first or upper concentrator 21 of the series.

At the outer or lower end of the series of concentrators, a discharge pipe 58 is provided and conducts the final acid product to a tank or receiver 59.

In the normal operation of the apparatus, the hot gaseous products of combustion will pass from the combustion chamber through the opening 11 at a temperature of about 2600° F. and the same will be divided into several streams by means of the spaced bars 12. These streams of gaseous products of combustion will commingle, in the flue 7, with streams of products of combustion entering between the bars 15 at a temperature of about 700° F.,—the mixture of the two streams of hot products of combustion in the flue 7 raising the temperature of the warm gases from flue 10 and lowering the temperature of the hot gases from flue 11 to about 1400° F., which is a temperature that the concentrators will safely stand. The hot gases entering the inclined flue 8 under the concentrators, will heat the latter and cause the water to be boiled out of the acid which they contain,—said water passing in the form of steam or vapor from one concentrator to another and finally to the drum 43 as previously explained. By the time that the hot gaseous products shall have reached the right hand end of the flue 8, its temperature will have been reduced to about 700° F. About two thirds of these gaseous products will descend through the flue 9 to the flue 10 and from the latter, (in the form of streams) to the flue 7 over the combustion chamber, with the result above explained. About one-third of the gaseous products will pass from the flue 8 to the stack. The proper relative proportions of gaseous products taking the two routes from the flue 8, so as to insure circulation through the flues 9 and 10, may be regulated by a suitable damper such as indicated at 60, and the damper 18 may also be employed to assist in such regulation of the circulation of the gaseous products.

It will be observed that with my improved apparatus, the first concentrators of the series containing the weak acid, are subjected first to the hottest products of combustion and that the temperature of the latter will gradually decrease as they reach the end of the series of concentrators which contain the concentrated acid. The weak acid thus subjected to the highest temperature will contain considerable water to be vaporized and will therefore utilize the heat very rapidly. Furthermore, when the high degree of heat strikes the first concentrators, cold acid is being admitted which must be heated to the boiling point, and consequently the most violent splashing does not take place in the first concentrator.

Again the introduction of the high temperature of the gaseous products of combustion at the end of the apparatus where the weak acid is admitted, will cause the temperature of said gaseous products to fall rapidly as they travel through the flue or passage 8 under the concentrators toward the end of the apparatus where the concentrators containing the most highly condensed acid is located. Thus the bulk of the work for effecting concentration will be accomplished where the acid contains a considerable amount of water and as the acid passes through the concentrators to the discharge end of the apparatus, the temperature of the heating gaseous products becomes reduced several hundred degrees, thereby allowing the strong acid, which contains very little water, to boil more slowly and decomposition of a larger portion of the acid by excessive heat will be avoided. Thus I am enabled to accomplish properly, about twice as much work as could be accomplished in a less satisfactory manner, were the concentrators at the discharge end of the apparatus subjected first to the highest temperature.

The acid to be concentrated reaches the first concentrator at the upper end of the series at about 60 to 61 degrees Bé. and leaves the last concentrator at approximately 66 degrees Bé. As the acid flows from one concentrator to another, its degree of temperature as well as its degree of concentration will increase, so that in some instances when the highest degree of concentration is reached, the temperature of the discharged acid may reach 600° F. The acid is discharged from the final concentrator through the pipe 58 into the receiver 59 as previously stated.

In order to cool the lower portion of the receiver 59, the same is inclosed by a water jacket 61. A small vessel 62, closed at its bottom is inserted into the upper portion of the receiver 59 where it will acquire the temperature of the discharged final acid product and is so disposed within the receiver as not to interfere with access to the latter should it become necessary to loosen incrustation or sediment therein. The vessel 62 is made of material which shall be proof against both acid and mercury and is partially filled with the latter metal. Thermostat 63 is also disposed within the vessel 59, the same being secured at its lower end to a bracket 64 depending into the vessel and its upper end projecting above the top of the latter. The vessel 62 is supported by a bracket 65 which carries to adjustable contacts 66—67 between which the upper projecting end of the thermostat is disposed. The purpose of the thermostatic circuit controlling devices above described, is to provide means for automatically controlling the feed of acid to the apparatus as the temperature of the condensed acid at the discharge end of the apparatus rises above or falls below a predetermined degree.

In constructing the devices whereby the main feed valve 51 is automatically controlled, I provide a bracket 65$^a$ on which a shaft 66$^a$ carrying a ratchet wheel 67$^a$, is mounted. A pulley 68 is also secured to the shaft 66$^a$ and receives motion by means of a belt 68$^a$ from any suitable slow running motor, not shown. A yoke 69 having ratchet teeth 70—71 on its opposing inner faces receives the ratchet wheel or pinion 67$^a$. The lower arm of this yoke is pivotally connected to the stem of the feed valve 51, and the upper arm of said yoke is pivotally attached to one end of a bar or link 72. The other end of the bar 72 is pivoted to one end of a shaft 73 which is mounted to move longitudinally through plates 74—75 located upon the bracket 65$^a$. Electro-magnets 76—77 are secured to the respective brackets 74—75 and an armature 78 is secured to the shaft 73 so as to be disposed between the poles of the respective magnets. One terminal of the coil of magnet 76 is connected by a conductor 79 with the contact 66, and one terminal of the coil of magnet 77 is connected, by a conductor 80 with the contact 67. The other terminals of the coils of the two magnets 76 and 77 are connected to one terminal of a battery 81, the other terminal of this battery being connected, by a conductor 82 with the thermostat 63.

Normally, the armature 78 will be disposed centrally between the poles of the two magnets and the yoke 69 will be held in such position that neither of its ratchet members will engage the ratchet wheel 67a.

When the temperature of the concentrated acid discharged into the receiver 59 increases above that which is desired, the thermostat will be deflected to the left and engage the contact 87, thus closing the circuit of the magnet 75 and causing movement of the armature 78 and shaft 73 to the right. This movement of the shaft 73 will be transmitted through the bar or link 72 to the ratchet yoke 69 and cause the teeth 70 thereof to engage the ratchet wheel 67a. As this wheel is constantly rotated, motion will now be imparted to the ratchet yoke to move the same upwardly and operate the valve 51 to increase the feed of the acid to the apparatus. Should the temperature of the concentrated acid entering the receiver 59 fall below the desired degree, the thermostat will be deflected to the right and engage the contact 86, thus closing the circuit of the magnet 76 and causing the ratchet teeth 71 of the yoke 69 to engage the ratchet wheel 67a and the valve 51 to be lowered to decrease the feed of acid to the apparatus. It is not desirable that the flow of acid to the apparatus be completely closed, and to insure the entrance of an amount of acid which may be safely fed to the apparatus when the valve 51 closes, the operator may adjust the valve 50 to insure the continuation of feed of acid in a safe quantity. When the acid discharged into the receiver 59 gets too weak, thus causing its temperature to fall, the thermostat will operate as above described to cause the gradual closing of the valve to decrease the feed of acid to the apparatus, and thus the feed of acid may be automatically regulated.

The receiver 59, into which the concentrated acid flows, communicates at its lower end with a pipe or vessel 83 which passes upwardly through the cooling medium in the jacket 61 and projects above the same. The pipe or vessel 83 is provided at its upper end with a spout 84 which discharges into a funnel 85 pivotally mounted on said spout. This funnel is provided with a glass cover 86 through which the size of the stream of acid flowing through said funnel may be observed. The funnel 85 normally discharges through a funnel or hopper 87 into a pipe 88, and the latter will convey the acid to a suitable storage tank 89.

The bulk of the sulfuric acid as now manufactured and afterward subjected to concentration, is made from sulfids of iron and the acid is contaminated with the same. This sulfate is slightly soluble in cold dilute acid, and more so in hot acid, but it is not soluble in the strongly concentrated sulfuric acid; consequently when the highest concentration is reached, (which is 66. Bé.) the sulfate of iron held in solution, when entering the concentrators, as well as the sulfate of iron by formation in small quantities from the concentrators, after the concentration has been raised to a degree where these sulfates are no longer soluble, will form hard incrustation on the inner surface of the concentrators and if allowed to run long enough, this incrustation will become a non-conductor of heat and allow the walls of the concentrators to become overheated and broken. In accordance with the practice heretofore employed,—after the apparatus has been running for a certain length of time, it is shut down and the concentrators removed and cleaned. My improvements contemplate means whereby such practice as above described may be avoided and the concentrators cleared of incrustation without necessity of removing them. The instrumentalities and the method which I employ for this purpose will now be explained.

A tank 90 is provided to contain chamber acid (which has a strength of about 47 or 48 degrees Bé.) and connect the same with a tank 91,—a suitable valve 92 being provided in the pipe or duct connecting these tanks. Manually operable valves 93—94 are provided for controlling the feed of chamber acid to the pan 53 and through the pipe 57 to the first of the series of concentrators. At the discharge end of the apparatus, a pipe 95 is located and provided with a hopper or funnel 96 with which the pivoted funnel 85 may be caused to communicate. The pipe 95 is connected with a suitable storage tank 97.

When it becomes necessary to clean the concentrators, the valve 47 or the valves 50, 51 or all of them will be closed to stop the feed of the 60 degree acid from the supply tank 45, and open the valves 92—93—94 so as to cause the flow of the chamber acid from the tank 90 to the concentrators. The weak acid is thus fed to the concentrators without stopping the operation of the apparatus and the amount of feed can be easily regulated by manipulating the valves 93—94. While the weak chamber acid is being partially concentrated during its passage through the apparatus, it will dissolve incrustation in the concentrators and in the pipes and vessels through which it passes on its way from the concentrators to the storage tank 97 and it will also dissolve any sediment which may have been formed. Thus the apparatus will be cleaned. While the apparatus is being operated for cleaning purposes, it is doing other good work in concentrating the chamber acid. After the apparatus shall have become cleaned, the valves 92—93—94 may be closed and the valves 47—50—51 opened, when the 60 degree acid from the tank 45 will be again fed to the apparatus and the latter will then proceed in operation of the concentration process as previously described.

I do not in this application, claim the feature herein described involving the cleaning of the concentrators by dissolving the incrustation resulting from high concentration, with the use of a weak acid,—the same being the subject of a divisional application filed by me on the 30th day of December, 1918, and designated by Serial No. 268,872.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In apparatus for concentrating sulfuric acid, the combination with a connected series of concentrators and means for feeding acid into the concentrator at one end of the series, of heating means arranged to apply the highest degree of heat to the concentrator into which the acid is fed and then to apply heat to the other concentrators of the series successively.

2. In apparatus for concentrating sulfuric acid, the combination with an inclined series of connected concentrators, and means for feeding acid to the upper end of said series of concentrators, of means for heating said concentrators successively from the upper to the lower end of the series, the highest degree of heat being applied to the concentrators at the upper end of the series.

3. In apparatus for concentrating sulfuric acid, the combination with an inclined series of connected closed concentrators, means for feeding acid to the upper end of said series, and means for discharging concentrated acid from the lower end of said series, of heating means, means for supplying the highest degree of heat from said heating means first to the upper end of the series of concentrators and then supplying heat successively to the remaining concentrators of the series.

4. In apparatus for concentrating sulfuric acid the combination with a furnace structure comprising a combustion chamber and a connected series of flues including a flue over the combustion chamber for effecting a continuous circulation of products of combustion from the combustion chamber and back to the flue over the combustion chamber, of a connected series of concentrators forming the top of one of said flues, a stack connected with one of said flues, means for feeding acid to one end of the series of concentrators, and means for discharging acid from the other end of said series of concentrators.

5. In apparatus for concentrating sulfuric acid, the combination of a furnace structure having a combustion chamber, a bridge wall forming a vertical flue communicating with the combustion chamber, a flue over the bridge wall communicating with said vertical flue, a vertical flue at the opposite end of the flue over the bridge wall, and a bottom flue connecting the last-mentioned vertical flue with the first-mentioned vertical flue, a stack communicating with the exit end of the flue over the bridge wall, a connected series of concentrators over the last mentioned flue, means for feeding acid to the end of the series of concentrators nearest the first-mentioned vertical flue, and means for discharging acid from the opposite end of the series of concentrators.

6. In apparatus for concentrating sulfuric acid, the combination of a furnace structure having a bridge wall and comprising a combustion chamber, a vertical flue, a plurality of passages connecting the combustion chamber with the vertical flue, a flue over the bridge wall communicating at one end with the upper end of said vertical flue, flues connecting the other end of the flue over the bridge wall and the vertical flue and communicating with the latter, a stack communicating with the flue over the bridge wall, a connected series of concentrators over said last-mentioned flue, means for feeding acid to the end of said series of concentrators nearest said vertical flue, and means for discharging acid from the end of the series of concentrators nearest the stack.

7. In apparatus for concentrating sulfuric acid, the combination with a furnace structure having a flue, means for supplying products of combustion to one end of said flue, and a stack communicating with the other end of said flue, of a connected series of concentrators disposed over said flue, means for feeding acid to the end of the series of concentrators nearest the end thereof at which the products of combustion enter, and means for discharging acid from the end of said series of concentrators nearest the stack.

8. In apparatus for concentrating sulfuric acid, the combination with a furnace structure, of a plurality of closed concentrators supported in position to be heated by gaseous products of combustion passing through said furnace structure, means connecting said concentrators in series, means for feeding acid to the end of the series of concentrators nearest the source of the gaseous products of combustion and means for discharging the concentrated acid from the end of the series of concentrators farthest removed from the source of gaseous products of combustion.

9. In apparatus for concentrating sulfuric acid, the combination with a furnace structure, of a plurality of closed communicating concentrators connected in series, means removably suspending said concentractors in said furnace structure, means for feeding acid to one end of the series of concentrators, and means for discharging concentrated acid from the other end of said series of concentrators.

10. The combination with a furnace structure having a flue for gaseous products of combustion, of a connected series of closed concentrators over said flue, bars on the furnace structure and hangers connecting said bars with the several concentrators of the series and suspending said concentrators over said flue.

11. The combination with heating means, of a series of closed containers, elbow spouts connecting said containers, each elbow spout being rigid with one container and having a ball-joint connection with the adjacent container, means for feeding material to be treated into one end of the series of containers, and means for discharging the treated product from the other end of said series of containers.

12. The combination with heating means, of a series of closed containers, elbow spouts connecting said containers, each elbow spout being made rigid with one container and movably connected with the adjacent container, a bail embracing each elbow spout and engaging the adjacent concentrator, a spring between each bail and elbow spout, means for feeding material to be treated into one end of the series of containers, and means for discharging the treated product from the other end of the series of containers.

13. The combination with heating means, of a series of closed containers, elbow spouts connecting said containers, each elbow spout having movable connection with one of said containers, a bail embracing each elbow spout and engaging one of said containers, an adjusting screw carried by each bail, a spring disposed between each adjusting screw and elbow spout, means for feeding material to be treated to one end of the series of containers, and means for discharging the treated product from the other end of the series of containers.

14. The combination of a series of connected closed containers, each having a normally closed cleaning and inspection opening, means for heating said containers, means for feeding material to be treated into one end of said series of containers, and means for discharging the treated product from the other end of said series of containers.

15. The combination with a connected series of concentrators, and means for heating the same progressively from the inlet to the outlet end of the series, of a feed valve at one end of the apparatus, a receiver at the other end of the apparatus, electrically controlled means for said feed valve, and a thermostatic device controlled by the temperature in said receiver and connected in circuit with said electrically controlled means.

16. The combination with a connected series of concentrators, and means for heating the same, of a feed valve at one end of the series, a receiver at the discharge end of the series, a gear, means for rotating the same, a yoke having two rock bars to coöperate with said gear, a connection between said yoke and the feed valve, two electromagnets, a longitudinally movable shaft, an armature carried by said shaft between the poles of the electro-magnets, a bar pivoted at one end to said shaft and at the other end to said yoke, a thermostatic device controlled by the temperature in said receiver, and electric circuits including said thermostatic device and the coils of said electro-magnets.

17. The combination with a connected series of containers, and means for heating the same, of a feed tank, a manually controlled valve for said feed tank, a receiving tank at the discharge end of the series of containers, a thermostatic device controlled by the temperature in said receiver, another feed valve for the feed tank, and means controlled by the thermostat for controlling the operation of said last-mentioned feed valve.

18. The combination with a series of communicating concentrators, of means for feeding acid into one end of said series of concentrators, means for heating the concentrators and applying the greatest degree of heat at the end of the series to which acid is fed, means located near the end of the series of concentrators into which the acid is fed and communicating with the latter so as to receive steam and aqueous vapor therefrom, and means for recovering concentrated acid from the other end of the series of concentrators.

19. The combination with a connected series of concentrators, and means for heating the same, of means for feeding acid into one end of the series of concentrators, a pipe communicating with the other end of the series of concentrators, a receiver into which said pipe discharges, a vessel communicating at its lower end with the lower end of the receiver, a cooling jacket for portions of said receiver and vessel, a spout at the upper end of said vessel, a funnel into which said spout discharges, a discharge pipe, and a funnel on said discharge pipe and into which the first-mentioned funnel discharges.

20. The herein described method of concentrating sulfuric acid, consisting in supplying acid to one end of a series of connected concentrators, applying the highest degree of heat to that portion of the series of concentrators at which the acid first enters, and heating the remaining concentrators successively with gradually decreasing degrees of heat toward the end of the series of concentrators from which the concentrated acid is discharged.

21. The herein described method of concentrating sulfuric acid, consisting in passing the acid progressively through closed concentrators, feeding acid into one end of said series of concentrators, recovering aqueous products from the same end of the series of concentrators, recovering concentrated acid from the other end of the series of concentrators, and heating said concentrators progressively with gradually decreasing temperatures from the inlet to the outlet end of the series.

In testimony whereof I have signed this specification in the presence of two subscribing witnesses.

JOHN PATTEN.

Witnesses:
ARTHUR D. THOMPSON,
E. RUTH TURNER.